US012558943B2

(12) United States Patent
Gaertner et al.

(10) Patent No.: US 12,558,943 B2
(45) Date of Patent: Feb. 24, 2026

(54) AIR CONDITIONING SYSTEM

(71) Applicant: VALEO KLIMASYSTEME GMBH, Bad Rodach (DE)

(72) Inventors: Stefan Gaertner, Bad Rodach (DE); Bodo Gesell, Bad Rodach (DE)

(73) Assignee: Valeo Klimasystems GmbH, Bad Rodach (DE)

(*) Notice: Subject to any disclaimer, the term of this patent is extended or adjusted under 35 U.S.C. 154(b) by 186 days.

(21) Appl. No.: 18/553,671

(22) PCT Filed: Mar. 31, 2022

(86) PCT No.: PCT/EP2022/058634
§ 371 (c)(1),
(2) Date: Oct. 2, 2023

(87) PCT Pub. No.: WO2022/207830
PCT Pub. Date: Oct. 6, 2022

(65) Prior Publication Data
US 2024/0198767 A1 Jun. 20, 2024

(30) Foreign Application Priority Data
Mar. 31, 2021 (EP) .................................... 21166487

(51) Int. Cl.
*B60H 1/32* (2006.01)
*B60H 1/00* (2006.01)
(52) U.S. Cl.
CPC ....... *B60H 1/3233* (2013.01); *B60H 1/00021* (2013.01); *B60H 2001/00078* (2013.01)
(58) Field of Classification Search
CPC ................ B60H 1/3233; B60H 3/0608; B60H 2001/00078; B60H 1/00028
See application file for complete search history.

(56) References Cited

U.S. PATENT DOCUMENTS

| | | | |
|---|---|---|---|
| 9,908,072 B2 | 3/2018 | Wolowicz | |
| 2002/0011325 A1 | 1/2002 | Shikata et al. | |
| 2021/0396405 A1 | 12/2021 | Crank | |

FOREIGN PATENT DOCUMENTS

| | | | |
|---|---|---|---|
| DE | 102014226508 A1 | 6/2016 | |
| EP | 0578582 A1 | 1/1994 | |

(Continued)

OTHER PUBLICATIONS

European Patent Office, International Search Report and Written Opinion of corresponding International Application No. PCT/EP2022/058634, dated Jul. 15, 2022.

*Primary Examiner* — Lionel Nouketcha
(74) *Attorney, Agent, or Firm* — Valeo Klimasystems GmbH

(57) ABSTRACT

An air conditioning system having: a housing with a second fluid inlet, a second fluid outlet, and a second fluid circuit provided therebetween; a heat exchanger for the first fluid, at least partially encapsulated within the housing; a blower housing with a blower motor configured to accelerate the second fluid circulation through the second fluid circuit. The blower housing is at least partially encapsulated within the housing so that the blower motor is located at the lower level than the heat exchanger. The housing includes a filtering compartment located in the vicinity of the second fluid inlet. The filtering compartment further includes a filtering component, a filter fluid evacuation circuit for condensation fluid that condenses on the surface of the filtering component, and a second opening configured to evacuate the filter fluid from the housing. The second opening is fluidly connected to the filtering compartment.

19 Claims, 1 Drawing Sheet

(56)                    References Cited

FOREIGN PATENT DOCUMENTS

| | | | | |
|---|---|---|---|---|
| JP | H11170841 | A | * | 6/1999 |
| JP | 2003118358 | A | | 4/2003 |
| KR | 20080027512 | A | | 3/2008 |

* cited by examiner

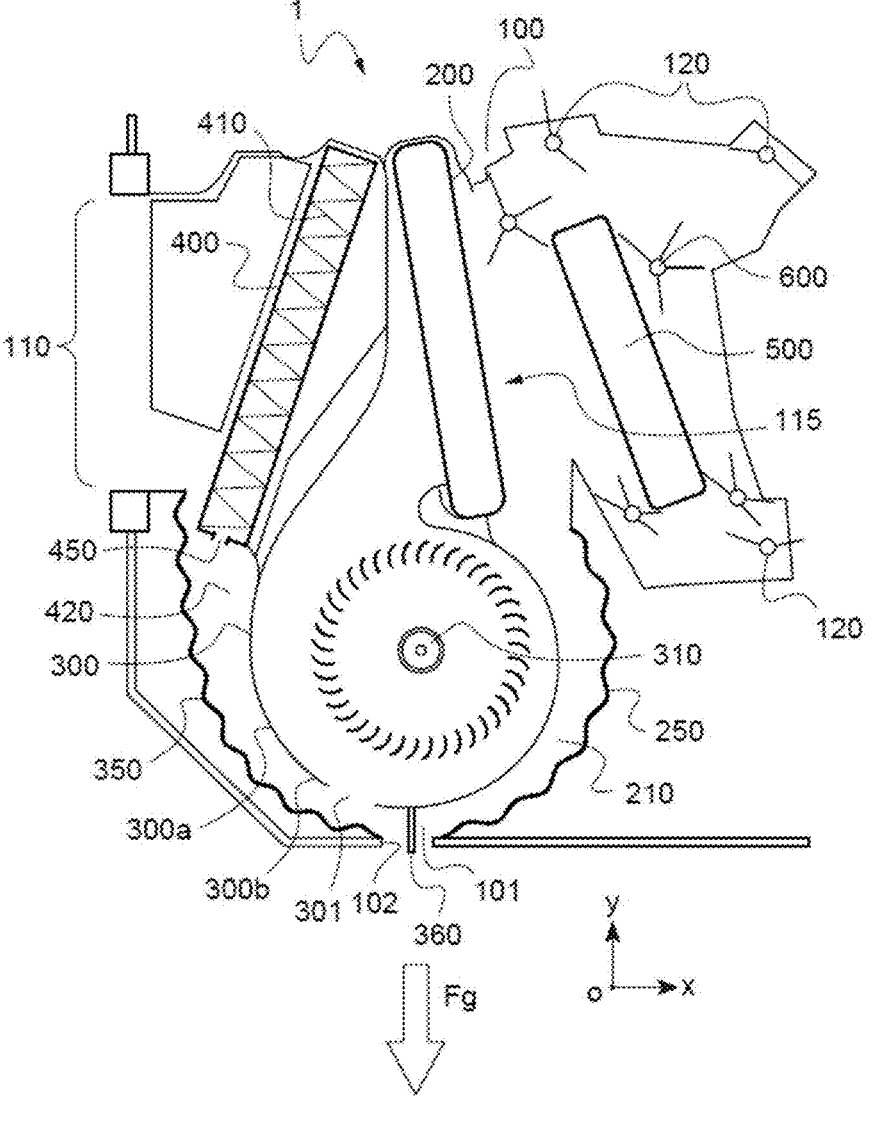

AIR CONDITIONING SYSTEM

TECHNICAL FIELD

The invention relates to an air conditioning system for a motor vehicle.

In particular, the invention relates to heating, ventilation, and air conditioning for motor vehicle.

BACKGROUND OF THE INVENTION

HVAC stands for heating, ventilation, and air conditioning.

The heating and air conditioning systems in today's modern vehicles, significantly improve user's comfortable while driving to its destinations. The heat can be transferred to passenger's cabin in the winter months, and the cool air that refreshes in the summer time.

The heater is basically a smaller version of cooling systems radiator. Hot engine coolant is circulated through a small radiator, often times called a heater core. A fan is positioned in the vicinity of the heater core to blow cold outside air over the fins. As this air travels over the heater core, it heats up and becomes the hot air which blows out heater vents.

The heater core can suffer some of the same issues. If the heater core becomes clogged with rust or sludge, its performance will drop dramatically. Often times the heater core is buried under the dashboard, and replacing it in case of failure is difficult, therefore it is desired to provide an HVAC system which would be resistant to failure caused by corrosion, moisture and sludge.

The air conditioning system is usually comprised of a compressor, condenser, expansion valve and evaporator. Refrigerant is compressed in the compressor and turns into a hot gas. In the condenser, this hot gas is cooled to a liquid state and travels to the expansion valve. As the refrigerant goes through the expansion valve it returns to a low-pressure gas and rapidly cools in the evaporator. A fan blows over the evaporator and cools the air that eventually blows out your vents. The cycles of heating or cooling down air cabin can cause collection of moisture present in fresh air as well as condensate accumulated on the surface of the evaporator.

The fluids accumulated within the HVAC system can cause aforementioned problems related to corrosion, contamination of moisture which can lead to undesired bacteria formation, and it can damage the electric devices such as blower motor, sensors etc.

Therefore, it would be desired to provide evacuation system for fluids not participating in heating or cooling down passenger's cabin.

Another object of the invention is to provide the system for heating, ventilation, and air conditioning which would require less parts and consequently would reduce the overall weight of the system.

SUMMARY OF THE INVENTION

The object of the invention is, among others, an air conditioning system for heat exchange between at least a first fluid and a second fluid comprising: a housing comprising at least one second fluid inlet, at least one second fluid outlet, and a second fluid circuit provided between the second fluid inlet and the second fluid outlet; at least one heat exchanger for the first fluid comprising a first fluid circuit, wherein the heat exchanger is at least partially encapsulated within the housing; a blower housing with a blower motor configured to accelerate the second fluid circulation through the second fluid circuit, wherein the blower housing is at least partially encapsulated within the housing, wherein the blower motor is located below the heat exchanger.

Advantageously, the housing further comprises and at least one condensation fluid evacuation circuit for condensation fluid that condenses on the surface of the heat exchanger, and at least one first opening configured to evacuate the condensation fluid from the housing.

Advantageously, the housing comprises at least one filtering compartment located in the vicinity of the second fluid inlet, wherein the filtering compartment further comprises at least one filtering means.

Advantageously, the housing further comprises at least one filter fluid evacuation circuit for at least condensation fluid that condenses on the surface of the filtering means, and at least one second opening configured to evacuate the filter fluid from the housing, wherein the second opening is fluidly connected to the filtering compartment.

Advantageously, the blower housing comprises an inner face facing the blower motor and an outer face opposite to the inner face.

Advantageously, the housing comprises at least one first collecting wall configured to guide the condensation fluid towards the first opening.

Advantageously, the housing comprises at least one second collecting wall configured to guide the filter fluid towards the second opening.

Advantageously, the filter fluid evacuation circuit is limited on one side by at least a part of the outer face of the blower housing, and on the other side by the second collecting wall.

Advantageously, the condensation fluid evacuation circuit is limited on one side by at least a part of the outer face of the blower housing, and on the other side by the first collecting wall.

Advantageously, the evacuation circuit is configured to gravitationally guide the fluid towards the opening.

Advantageously, the blower housing comprises a separation wall configured to fluidly isolate the condensation fluid evacuation circuit from the filter fluid evacuation circuit.

Advantageously, the filtering compartment comprises at least one channel configured to provide a fluid communication between the filtering compartment and the fluid evacuation circuit.

Advantageously, the second collecting wall is made of elastic material, so that the fluid-tight connection between the filtering compartment and the second opening is provided.

Advantageously, the heat exchanger is evaporator.

Another object of the invention is a motor vehicle comprising such system.

BRIEF DESCRIPTION OF THE DRAWINGS

Examples of the invention will be apparent from and described in detail with reference to the accompanying drawing, in which:

FIG. 1 shows a cross-section view of a system, according to embodiment of the invention.

DETAILED DESCRIPTION OF THE INVENTION

The subject-matter of the invention is, among others an air conditioning system 1 for heat exchange between at least a first fluid and a second fluid. The first fluid can be, for example a coolant or a refrigerant, whereas the second fluid can be, for example, fresh air, recirculation air or mixture of both of these examples.

The air conditioning system 1 can refer to heating, ventilation, and air conditioning system used in motor vehicles comprising e.g. an internal combustion engine, an electric motor, or a combination of both those types.

In order to simplify the description of the air conditioning system 1 according to the invention, a Cartesian reference is formed (o, x, y), and the direction o-x is defined as being the direction of the width of the, whereas o-y is the direction of the height.

It is to be noted, that the air conditioning system 1 described in further paragraphs and depicted in respective FIGURES is presented in desired orientation, therefore the reference points shall be selected based on the description and drawings only. The o-y can be defined as parallel to vector commonly associated gravitational force pointing downwards, wherein the direction of o-y is pointing the opposite direction to vector of gravitational force. Further, o-x can be defined as perpendicular to o-y. Synonyms such as "vertical" can thus be associated with direction o-y, whereas synonyms such as "horizontal" can be associated with direction o-x. It is also to be noted that the air conditioning system 1 depicted in the FIGURES in fixed with respect to directions o-y and o-x.

As shown in FIG. 1, the air conditioning system 1 for heat exchange between at least a first fluid and a second fluid can comprise a housing 100. The housing 100 can comprise at least one second fluid inlet 110, at least one second fluid outlet 120. The housing 100 can be made of any material (e.g. synthetic material such as plastic, etc.) or by any technique (e.g. plastic welding) which would provide a fluid-tight connection of the housing 100 between the second fluid inlet 110 and second fluid outlet 120. The housing 100 can thus comprise at least one second fluid circuit 115 provided between the second fluid inlet 110 and the second fluid outlet 120. The second fluid inlet 110 can be defined as a duct configured to deliver fresh air (ambient air) to the air conditioning system 1. Alternatively, second fluid inlet 110 can be defined as a duct configured to deliver a mixture of fresh and recirculated air, wherein the two types of delivered air can mix within the housing 100, as shown in FIG. 1.

The air conditioning system 1 can further comprise at least one heat exchanger 200 for the first fluid. The heat exchanger 200 shown in FIG. 1 can comprise a refrigerant circulating in a first fluid circuit. It is to be noted that the first fluid circuit is fluidly isolated form the second fluid circuit. The heat exchange between the first and the second fluids can be facilitated by plurality of thin tubed interlaced with fins. As shown in FIG. 1, the heat exchanger is entirely encapsulated within the housing 100. FIG. 1 shows a cross-section of the air conditioning system 1, therefore the lines or channels which deliver or collect refrigerant to the heat exchanger 200 have been omitted for the sake of clarity. An embodiment in which the heat exchanger 200 can be at least partially encapsulated within the housing 100 is also envisaged as long as the fluid tightness of the second circuit 115 is ensured.

The air conditioning system 1 can further comprise a blower housing 300 with a blower motor 310. The blower housing 300 can comprise an essentially circular cross-section which can be adapted to the shape of the blower motor 310. Phrase "essentially circular" can be regarded as comprising a curvature at least in a portion of the cross-section of the blower housing 300. The blower motor 310 can be an electric motor comprising shoulder blades which are engaged into motion around the axis a motor shaft when the blower motor 310 is in operational mode. The blower motor can be configured to accelerate the second fluid circulation through the second fluid circuit 115, wherein the blower housing 300 is at least partially encapsulated within the housing 100.

As further shown in FIG. 1 the blower motor 310 can be located below the heat exchanger 200. The term "below" can be formulated as being at a lower level. Referring to FIG. 1, the heat exchanger 200 is at the higher level than the blower motor 310, thus the blower motor is below the heat exchanger 200. In other words, the heat exchanger 200 is shifted upwards with respect to the blower motor 310 in o-y direction.

The level of each sub-component can be measured as the point located on the vector of gravitational force Fg, wherein the point is defined in the median section of the greatest cross-section of the sub-component projected onto the gravitational force vector Fg.

Since gravitational force Fg is pointing downwards, the terms such as "below", "above" etc. refer to the direction opposite to the direction pointed by the Fg. Therefore, the blower motor 310 can be defined as being located on the lower level than the heat exchanger 200, i.e. below the heat exchanger 200.

This particular location of the blower motor 310 encapsulated within its blower housing 300 allows to shorten the path of the second fluid circuit 115 between the blower 310 and the heat exchanger 200, so that the efficiency of the latter can be improved. Furthermore, it allows to reduce the number of parts required to form a duct between these sub-components, so the total weight of the air conditioning system 1 can be reduced.

The blower housing 300 can comprise an inner face 300a facing the blower motor 310 and an outer face 300b opposite to the inner face 300a.

The blower housing 300 can further comprise a housing evacuation opening 301. The housing evacuation opening 301 is configured to evacuate any fluid and/or particles which accidentally accumulate within the blower housing 300.

As discussed in previous paragraphs, the heat exchanger 200 can comprise a refrigerant circulating there-through, thus the heat exchanger 200 can serve as an evaporator for air conditioning system. During the operational or non-operational mode of the heat exchanger 200, the second fluid in the vicinity of the heat exchanger 200 can condensate from gas to liquid, due to temperature difference between the second fluid and the surface of the heat exchanger 200. To reduce the negative effects of liquid accumulation at the lower part of the heat exchanger 200, the condensate can be evacuated. Since the heat exchanger 200 can be made of metallic material such as aluminum, the evacuation of condensate from its surface allows to prevent the heat exchanger 200 from leakage due to, for example, corrosion of its sub-components.

In order to provide condensate evacuation system for the heat exchanger 200, the housing 100 can further comprise at least one condensation fluid evacuation circuit 210 for condensation fluid that condenses on the surface of the heat exchanger 200. The condensation fluid evacuation circuit 210 can be fluidly connected with at least one first opening 101 located on the very bottom portion of the housing 100. In other words, the first opening 101 can be collated below the blower housing 300. The first opening can be configured to evacuate the condensation fluid from the housing 100 i.e. the condensate flows irreversibly away from the housing 100.

As further shown in FIG. 1, the heat exchanger 200 can by inclined with respect to o-y, so that guiding of the condensate towards the condensation fluid evacuation circuit 210. The inclination of the heat exchanger 200 can be approximately 0-15 degrees with respect to o-y, so that the condensate does not break away from the surface of the heat exchanger 200. Moreover, the surface tension of aqueous solutions enable downward flow of the condensate towards the condensation fluid evacuation circuit 210.

The condensation fluid evacuation circuit 210 can be partially formed by a housing 100 and partially formed by blower housing 300. The housing 100 can comprise at least one first collecting wall 250 configured to guide the condensation fluid towards the first opening 101. As shown in FIG. 1, the first collecting wall 250 can be in a form of a curved portion; however, other shapes are also envisaged. It is to be noted that the first collecting wall 250 can be made integral with the housing 100. In other words, the first collecting wall 250 can be made during the same process, for example, plastic injection, so that there is no visible difference between the housing 100 and the first collecting wall 250.

The undesired liquid can also accumulate in the vicinity of the second fluid inlet 110. The fresh air and/or recirculated air can comprise water particles, either gaseous or liquid, which can bring negative effects on the air conditioning system 1, starting from corrosion of metallic sub-components, to failure of the blower motor 310 due to harmful, humid environment. The housing 100 can comprise at least one filtering compartment 400 located in the vicinity of the second fluid inlet 110, wherein the filtering compartment 400 further comprises at least one filtering means 410. The filtering means 410 can be configured to prevent solid particles from entering the second fluid circuit 115. Further, the filtering means 110 along with the filtering compartment 400 can collect the humidity and liquids transported through the second fluid inlet 110. The liquid collected on the filtering means 110 and/or filtering compartment can be defined as a filter fluid.

The housing 100 can further comprise at least one filter fluid evacuation circuit 420 located within the housing 100. The filter fluid evacuation circuit 420 enables evacuation of at least condensation fluid that condenses on the surface of the filtering means 410. The housing can further comprise at least one second opening 102 configured to evacuate the filter fluid from the housing 100, wherein the second opening 102 is fluidly connected to the filtering compartment 400 through the filter fluid evacuation circuit 420. It is to be noted that previously mentioned blower housing evacuation opening 301 can fluidly connect the inner volume of the blower housing with either the filter fluid evacuation circuit 420 or with the condensation fluid evacuation circuit 210.

The housing 100 can further comprise at least one second collecting wall 350 configured to guide the filter fluid towards the second opening 102. As shown in FIG. 1, the second collecting wall 350 can be in a form of a curved portion; however, other shapes are also envisaged. It is to be noted that the second collecting wall 350 can be made integral with the housing 100. In other words, the second collecting wall 350 can be made during the same process, for example, plastic injection, so that there is no visible difference between the housing 100 and the second collecting wall 350. Alternatively, the second collecting wall 350 can be attached to the housing 100. The second collecting wall 350 can be made of elastic material to ensure water-tightness of the filter fluid evacuation circuit 420. In another embodiment of and invention, the second collecting wall 350 can comprise a sealing portion (not shown) located between the housing 100 and the second collecting wall 350, wherein the sealing portion can be made of elastic material to ensure water-tightness of the filter fluid evacuation circuit 420.

The filter fluid evacuation circuit 420 can be limited on one side by at least a part of the outer face 300b of the blower housing 300, and on the other side by the second collecting wall 350. Similarly, the condensation fluid evacuation circuit 210 can be limited on one side by at least a part of the outer face 300b of the blower housing 300, and on the other side by the first collecting wall 250. However, it is to be noted that in the condensation fluid evacuation circuit 210 the condensate is in contact mainly with the outer face 300b of the blower housing 300 while flowing towards the first opening, whereas in the filter fluid evacuation circuit 420 the filter fluid can be in contact mainly with the second collecting wall 350 while flowing towards the second opening 102.

Nevertheless, both condensation fluid evacuation circuit 210 and filter fluid evacuation circuit 420 are configured to gravitationally guide the fluid towards respective openings 101, 102.

As shown in the FIG. 1, the blower housing 300 can comprise a separation wall 360 configured to fluidly isolate the condensation fluid evacuation circuit 210 from the filter fluid evacuation circuit 420. The filter fluid flowing through the filter fluid evacuation circuit 420 can have a greater velocity than the condensate flowing condensation fluid evacuation circuit 210, therefore the separation wall 360 can be implemented to prevent the filter fluid from entering the condensation fluid evacuation circuit 210, and further the second fluid circuit 115. The separation wall 360 shown in FIG. 1 is an essentially straight portion parallel to direction o-y. However, other types of separation walls 360 such as curved portions, or inclined portions are also envisaged. Alternatively, the separation wall 360 can be a separate element fixed, for example, the housing 100 and/or any feasible sub-component of the air conditioning system 1.

The filtering compartment 400 can comprises at least one channel 450 configured to provide a fluid communication between the filtering compartment 400 and the fluid evacuation circuit 420. As shown in FIG. 1, the channel 450 can be located beyond the level of the bottom portion of the filter compartment 400. The channel 450 can be in form of the orifice, which enables the filter fluid flow. As shown in FIG. 1, the channel 450 is formed in front of the filter compartment 400. In other words, the filter compartment 400 and/or the filter 410 is located downstream the channel 450.

Both the channel 450 and the openings 101, 102 could be provided with the valves (not shown) to facilitate filter liquid and condensate flow management.

As further shown in FIG. 1, the air conditioning system 1 can further comprise at least one secondary heat exchanger 500 being at least partially encapsulated within the housing 100. The secondary heat exchanger 500 can comprise a circuit for the third fluid. The secondary heat exchanger 500 can serve different purpose than the heat exchanger 200, for example, the secondary heat exchanger can be a heater core configured to heat exchanger with the second fluid. In particular, the secondary heat exchanger 500 can be utilized to heat up the second fluid traveling through the second fluid circuit 115.

As further shown if FIG. 1, the housing 100 can comprise a plurality of the second fluid outlets 120. Depending on the operational mode of the air conditioning system 1, the second fluid circuit 115 is directed to desired outlet 120. In order to change direction of flow of the second fluid circuit 115, the housing 100 can further comprise a plurality of flaps 600 located therein. The flaps 600 can change their positions from opened to closed, including intermediate positions. The flaps 600 allow changing the final second fluid temperature and/or velocity in specific outlets 120 before it exits the housing 100 and flows to the passenger's compartment (not shown).

Referring to second fluid circuit 115 depicted in FIG. 1 the architecture of the system can comprise the blower motor 300 located between the second fluid inlet 110 and the second fluid outlet 120, relatively to the second fluid flow direction.

Referring to second fluid circuit 115 depicted in FIG. 1 the architecture of the system can comprise the filtering means 410 located between the second fluid inlet 110 and the blower 300, relatively to the second fluid flow direction.

Referring to second fluid circuit 115 depicted in FIG. 1 the architecture of the system can comprise the heat exchanger 200 located between the blower 300 and the second fluid outlet 120, relatively to the second fluid flow direction.

Referring to second fluid circuit 115 depicted in FIG. 1 the architecture of the system can comprise a secondary heat exchanger 500 located between the heat exchanger 200 and the second fluid outlet 120, relatively to the second fluid flow direction.

The invention can also include a motor vehicle comprising the air conditioning system 1 described in previous paragraphs.

Other variations to the disclosed embodiments can be understood and effected by those skilled in the art in practicing the claimed invention, from a study of drawings, the disclosure, and the appended claims. The mere fact that certain measures are recited in mutually different dependent claims does not indicate that a combination of these measures cannot be used to the advantage.

What is claimed is:

1. An air conditioning system for exchanging heat between a first fluid and a second fluid, comprising:
   a housing including at least one second fluid inlet, at least one second fluid outlet, and a second fluid circuit provided between the at least one second fluid inlet and the at least one second fluid outlet;
   at least one heat exchanger for the first fluid, the at least one heat exchanger including a first fluid circuit, wherein the at least one heat exchanger is at least partially encapsulated within the housing;
   a blower housing with a blower motor configured to ensure circulation of the second fluid through the second fluid circuit, wherein the blower housing is at least partially encapsulated within the housing so that the blower motor is located at a lower level than the at least one heat exchanger, wherein each level is measured with respect to gravitational force affecting the air conditioning system;
   wherein the housing includes at least one filtering compartment located in the vicinity of the at least one second fluid inlet, wherein the at least one filtering compartment includes at least one filtering component configured to prevent solid particles from entering the second fluid circuit, and at least one condensation fluid evacuation circuit for a condensation fluid that condenses on a surface of the at least one heat exchanger, at least one first opening configured to evacuate the condensation fluid from the housing;

wherein the condensation fluid evacuation circuit is at least partially formed by the housing and at least partially formed by the blower housing.

2. The air conditioning system according to claim 1, wherein the housing includes at least one filter fluid evacuation circuit for at least a filter fluid that is separated on a surface of the at least one filtering component, and at least one second opening configured to evacuate the filter fluid from the housing, wherein the at least one second opening is fluidly connected to the at least one filtering compartment.

3. The air conditioning system according to claim 2, wherein the housing includes at least one first collecting wall configured to guide the condensation fluid towards the at least one first opening.

4. The air conditioning system according to claim 2, wherein the blower housing includes a separation wall configured to fluidly isolate the at least one condensation fluid evacuation circuit from the at least one filter evacuation circuit.

5. The air conditioning system according to claim 1, wherein the blower housing includes an inner face facing the blower motor and an outer face opposite to the inner face.

6. The air conditioning system according to claim 5, wherein the housing includes at least one second collecting wall configured to guide the filter fluid towards the at least one second opening, wherein the at least one filter fluid evacuation circuit is limited on one side by at least a part of the outer face of the blower housing, and on the other side by the at least one second collecting wall.

7. The air conditioning system according to claim 5, wherein the housing includes at least one first collecting wall configured to guide the condensation fluid towards the at least one first opening, wherein the at least one condensation fluid evacuation circuit is limited on one side by at least a part of the outer face of the blower housing, and on the other side by the at least one first collecting wall.

8. The air conditioning system according to claim 1, wherein the housing includes at least one second collecting wall configured to guide the filter towards the at least one second opening.

9. The air conditioning system according to claim 8, wherein the at least one second collecting wall includes at least a portion of elastic material, so that the fluid-tight connection between the at least one filtering compartment, the blower and the at least one second opening is provided.

10. The air conditioning system according to claim 8, wherein the housing includes at least one first collecting wall configured to guide the condensation fluid towards the at least one first opening, wherein the at least one second collecting wall and the at least one first collecting wall are made in one piece, wherein at least a portion of the at least one first collecting wall and the at least one second collecting wall includes an elastic material.

11. The air conditioning system according to claim 1, wherein the at least one filter evacuation circuit is configured to gravitationally guide the fluid towards the at least one second opening.

12. The air conditioning system according to claim 1, wherein the at least one filtering compartment includes at least one channel configured to provide a fluid communication between the at least one filtering compartment and the at least one fluid evacuation circuit.

13. The air conditioning system according to claim 12, wherein the at least one filtering compartment is located downstream with respect to the at least one channel.

14. The air conditioning system according to claim 1, wherein the at least one heat exchanger is an evaporator.

15. The air conditioning system according to claim 1, wherein the at least one condensation fluid evacuation circuit extends along the outer surface of the blower housing.

16. A motor vehicle comprising an air conditioning system for exchanging heat between at least a first fluid and a second fluid, including:

a housing including at least one second fluid inlet, at least one second fluid outlet, and a second fluid circuit provided between the at least one second fluid inlet and the at least one second fluid outlet;

at least one heat exchanger for the first fluid, the at least one heat exchanger including a first fluid circuit, wherein the at least one heat exchanger is at least partially encapsulated within the housing;

a blower housing with a blower motor configured to ensure circulation of the second fluid through the second fluid circuit, wherein the blower housing is at least partially encapsulated within the housing so that the blower motor is located at a lower level than the at least one heat exchanger, wherein each level is measured with respect to gravitational force affecting the air conditioning system;

wherein the housing includes at least one filtering compartment located in the vicinity of the at least one second fluid inlet, wherein the at least one filtering compartment includes at least one filtering component configured to prevent solid particles from entering the second fluid circuit, at least one condensation fluid evacuation circuit for a condensation fluid that condenses on a surface of the at least one heat exchanger, at least one first opening configured to evacuate the condensation fluid from the housing;

wherein the condensation fluid evacuation circuit is at least partially formed by the housing and at least partially formed by the blower housing.

17. The motor vehicle comprising the air conditioning system according to claim 16, wherein the at least one condensation fluid evacuation circuit is configured to gravitationally guide the fluid towards the at least one first opening.

18. The motor vehicle comprising the air conditioning system according to claim 16, wherein the housing includes at least one filter fluid evacuation circuit for at least a filter fluid that is separated on a surface of the at least one filtering component, and at least one second opening configured to evacuate the filter fluid from the housing, wherein the at least one second opening is fluidly connected to the at least one filtering compartment.

19. The motor vehicle comprising the air conditioning system according to claim 16, wherein the at least one condensation fluid evacuation circuit extends along the outer surface of the blower housing.

* * * * *